3,187,050
PROCESS FOR CONDITIONING REDUCIBLE CYCLIC ORGANIC COMPOUNDS
Raymond J. Duggan, West Seneca, and Leon O. Winstrom, East Aurora, N.Y., assignors to Allied Chemical Corporation, New York, N.Y., a corporation of New York
No Drawing. Filed Mar. 7, 1961, Ser. No. 93,868
13 Claims. (Cl. 260—582)

This invention relates to an improved process for conditioning reducible cyclic organic compounds containing metallic and non-metallic impurities. It relates more particularly to an improved process for conditioning a cyclic organic compound of the group consisting of phenol, aniline and nitrobenzene containing said impurities.

It is well-known that reducible cyclic organic compounds such as phenol, aniline and nitrobenzene contain metallic and non-metallic impurities which during catalytic hydrogenation affect the catalyst so as to reduce its efficiency and adversely affect its selectivity. For example, commercial phenol generally has sulfur and halogen (e.g. chlorine) contents in excess of 20 parts per million and an iron content greater than 0.3 part per million. Additionally, alpha-methylstyrene and acetophenone are present in phenol manufactured from cumene hydroperoxide. Hydrogenation over a conventional hydrogenation catalyst of phenol containing such impurities not only gives relatively poor yields at low rates of conversion but also results in rapid deterioration of the catalyst. If the phenol has been stored prior to hydrogenation, as is common in commercial practice, these adverse results are accentuated. Further, commercial aniline and nitrobenzene generally contain appreciable amounts of iron, sulfur and halogen impurities. In catalytic hydrogenation of such materials, relatively poor yields, low conversion rates and rapid deterioration of catalyst efficiency and selectivity result. Storage of the aniline and nitrobenzene, as in the case of phenol, aggravates these results.

The purification procedures taught by the prior art have been unsatisfactory for conditioning reducible cyclic organic compounds containing metallic and non-metallic impurities for catalytic hydrogenation. For example, the distillation of phenol preceded by treatment with either alkali metal bases or mineral acid or acid-reacting substances does not effectively reduce its content of metallic and non-metallic impurities to render it more suitable for catalytic hydrogenation and/or to prevent its deterioration on storage. Further, compounds such as aminocarboxylic acids, known to effectively remove metallic impurities, have been used as stabilizing additives for phenol containing metallic and non-metallic impurities but have given little improvement in the yield and/or facility of catalytic hydrogenation.

It is, therefore, an object of the present invention to provide an improved process for conditioning reducible cyclic organic compounds containing metallic and non-metallic impurities and particularly for conditioning a cyclic organic compound of the group consisting of phenol, aniline and nitrobenzene containing said impurities to render it more suitable for catalytic hydrogenation.

Another object of this invention is to provide an improved process for conditioning cyclic organic compounds containing metallic and non-metallic impurities and particularly for conditioning a cyclic organic compound of the group consisting of phenol, aniline and nitrobenzene containing said impurities to improve its storage stability.

Further objects and advantages of the invention will appear in the following description and examples.

We have discovered a process for conditioning a cyclic organic compound containing metallic and non-metallic impurities, which compound is readily reducible by catalytic hydrogenation and is stable under the conditions of the process, comprising the steps of (1) commingling the cyclic organic compound with a conditioning agent of the group consisting of ethylenediaminetetraacetic acid and the alkali metal salts thereof, (2) heating the resulting mixture at temperature of at least about 80° C. for a period of at least about one hour and (3) distilling off the conditioned cyclic organic compound from the mixture.

Our invention, as indicated above, is applicable to any cyclic organic compound containing metallic and non-metallic impurities which is readily reducible by catalytic hydrogenation and is stable under the conditions of the process. Although the invention relates particularly to conditioning of phenol, aniline and nitrobenzene, other reducible cyclic organic compounds which may be conditioned include nitrocyclohexane, quinoline, toluidine, methylene dianiline, etc.

We prefer to employ the readily available trisodium salt of ethylenediaminetetraacetic acid as the conditioning agent. However, the free acid or other alakli metal salts of ethylenediaminetetraacetic acid, including the ammonium salts thereof, may be employed. Thus, we may use ethylenediaminetetraacetic acid as well as the monosodium, disodium, tetrasodium, monosodium monopotassium, monosodium dipotassium, disodium dipotassium, trisodium monopotassium, disodium monopotassium, monopotassium, dipotassium, tripotassium and tetrapotassium salts of ethylenediaminetetraacetic acid.

The amount of the conditioning agent added is small and usually varies within the range of about 0.01 to 2% (calculated as the trisodium salt of ethylenediaminetetraacetic acid) by weight of the compound being treated. In the case of reducible cyclic compounds containing relatively small amounts of impurities, a satisfactory conditioning can be achieved with concentrations of conditioning agent less than 0.01% such as 0.001%. It may be necessary to employ an amount of the conditioning agent greater than 2% if the compound which is treated contains unusually large amounts of metallic and non-metallic impurities, for example, if its combined sulfur and halogen content is substantially in excess of 100 parts per million. Generally speaking, however, use of the conditioning agent in amount within the range of about 0.015 to 0.1% (calculated as the trisodium salt of ethylenediaminetetraacetic acid) by weight of the compound being treated produces the desired results and, hence, is preferred.

When phenol or aniline is to be treated by the process of our invention, we preferably add to the reaction mixture prior to heat treatment a small amount of a caustic alkali such as sodium or potassium hydroxide. The caustic alkali serves to offset any acidity which may be present in the phenol or aniline. Although the amount of caustic alkali added may vary widely, it is preferably used in amount about equal to the weight of the conditioning agent. The caustic alkali may be employed in either dry form or as an aqueous solution.

The heating step is carried out at a temperature of at least about 80° C. and preferably at least about 150° C., as in the range of about 150° to 250° C. Although atmospheric pressure is preferred, reduced pressure may be used, if desired. Conveniently the heating step is conducted at the reflux temperature of the reaction mixture. The duration of the heating step varies inversely with the temperature employed. Thus, as higher temperatures are employed, the duration of the heating step may be decreased. Generally speaking, the duration of the heating step ranges from about 1 to 20 hours or more, a period of at least about 2 hours, e.g. about 2 to 6 hours, being preferred. In particular, if the process is conducted in continuous manner, the heating step should be carried out for a period of at least about 2 hours.

In order to attain the desired results of this invention, the heat-treated mixture must then be distilled to recover the conditioned cyclic organic compound as overhead. This distillation may be carried out at atmospheric or reduced pressure, as desired.

The conditioning process of our invention not only reduces the metallic content of the cyclic organic compound being treated but also surprisingly decreases the amounts of non-metallic impurities, including sulfur and/or halogen-containing substances, as well as various organic compounds such as alpha-methylstyrene, acetophenone, etc. These non-metallic impurities are believed to be principally responsible for the adverse effects in the catalytic hydrogenation of the cyclic organic compound. Typical analyses before and after conditioning commercial phenol are given below:

| Impurity | Content in parts per million before conditioning | Content in parts per million after conditioning |
| --- | --- | --- |
| Iron | >0.3 | <0.1 |
| Sulfur | >20 | <20 |
| Halogen | >20 | <20 |
| Alpha-methylstyrene | 100–150 | 50–75 |
| Acetophenone | 150–200 | 75–100 |

Notably improved yield of reduction products with higher rate of conversion and smaller amount of undesired by-products result from catalytic hydrogenation of a compound conditioned according to our invention. Moreover, catalytic hydrogenation of a compound conditioned according to our invention has no substantial deteriorating effect upon the activity and/or selectivity of the hydrogenation catalyst. The catalyst may, therefore, be recycled with minimal deterioration, thus permitting use of the catalyst in a continuous hydrogenation process.

The improved storage stability of the cyclic organic compound conditioned according to our invention imparts another advantage in that it permits storage of the compound for an extended period prior to its use without substantial loss of the benefits of the conditioning process. For example, phenol conditioned according to our invention may be transported or stored in molten state for extended periods, even in vessels constructed of iron, without substantial degradation of its color, pH and suitability for catalytic hydrogenation.

The following examples illustrate the process of our invention and include the best mode known to us for carrying it out. In the examples, parts and percentages are by weight.

EXAMPLE 1

A mixture of 4,000 parts of commercial phenol produced by the cumene hydroperoxide process (containing iron, sulfur-containing, halogen-containing, alpha-methylstyrene and acetophenone impurities), 0.8 part of the monohydrate of the trisodium salt of ethylenediaminetetraacetic acid (hereinafter referred to as trisodium EDTA) and 0.8 part of sodium hydroxide was charged to a distillation unit containing a 10 plate column. The mixture was heated to its reflux temperature at atmospheric pressure (about 182° C.) and was gently refluxed for two hours. The phenol was then distilled at atmospheric pressure until the still head temperature began to fall with increasing still pot temperature indicating that only high boiling substances remained in the still pot. The improved quality of the distilled phenol was determined by the following hydrogenation test.

A reaction mass containing 1000 parts of the conditioned phenol, 1 part of 5% palladium-on-charcoal catalyst and 0.01 part of sodium carbonate was charged to a suitable pressure reactor. The reaction mixture was heated to 185° C. and agitated while hydrogen was fed into the bottom of the reactor at a rate sufficient to maintain an excess of hydrogen at a pressure of 70 p.s.i.g. After 150 minutes the rate of hydrogen consumption had fallen below 0.5 cubic foot per hour indicating the completion of the reaction. The mixture was discharged from the reactor, and the catalyst was filtered from the product. The filtrate was quantitatively analyzed by infrared spectrometry for cyclohexanone, cyclohexanol and phenol. The hydrogenation process was then repeated in a second cycle using the original charge of catalyst and a fresh quantity of conditioned phenol. The results of this experiment, as compared to similar catalytic hydrogenation of non-conditioned phenol, are shown in Table 1.

*Table 1*

| Conditioning technique | Treating agents | Hydrogenation test data | | | | |
| --- | --- | --- | --- | --- | --- | --- |
| | | Catalyst cycle | Time, minutes | Percent cyclohexanone | Percent cyclohexanol | Percent phenol |
| None | None | 1 | 195 | <40 | | >60 |
| As described in Example 1. | 0.02% trisodium EDTA. 0.02% NaOH | 1 | 150 | 97.5 | 2.0 | <0.5 |
| | | 2 | 150 | 97.5 | 2.0 | <0.5 |

The criteria used to evaluate the results of the above hydrogenation test are:

(1) The acceptable time required to complete hydrogenation of the phenol is 180 minutes or less.

(2) Minimum acceptable quality of the hydrogenation product is at least 93% cyclohexanone, not more than 6% cyclohexanol and not more than 1% phenol.

EXAMPLES 2 TO 9

The results of tests in which one or more of the process variables of Example 1 were altered are given in Table 2.

Table 2

| Example | Conditioning technique | Treating agents | Hydrogenation test data ||||| 
|---|---|---|---|---|---|---|---|
| | | | Catalyst cycle | Time, minutes | Percent cyclohexanone | Percent cyclohexanol | Percent phenol |
| 2 | As described in Example 1 except no treating agents were used. | None | 1 | 180 | 81 | 18 | 1 |
| | | | 2 | 240 | 61 | 30 | 8 |
| 3 | As described in Example 1 except no conditioning agent was used. | 0.02% NaOH | 1 | 150 | 94 | 5 | 1.0 |
| | | | 2 | 210 | 85 | 3.5 | 1.5 |
| 4 | As described in Example 1 except lower concentration of treating agents was used. | 0.01% trisodium EDTA, 0.01% NaOH | 1 | 160 | 96 | 3 | 1 |
| 5 | As described in Example 1 except not sodium hydroxide was used. | 0.02% trisodium EDTA | 1 | 150 | 97.6 | 1.7 | 0.7 |
| | | | 2 | 155 | 98.5 | 1.2 | 0.3 |
| 6 | As described in Example 1 except no sodium hydroxide and different conditioning agent were used. | 0.1% ethylenediamine-tetra-acetic acid. | 1 | 150 | 95 | 4 | <0.5 |
| | | | 2 | 180 | 93 | 6 | <0.5 |
| 7 | As described in Example 1 except no sodium hydroxide and different conditioning agent were used. | 0.1% tetrasodium salt of ethylenediamine-tetra-acetic acid. | 1 | 150 | 96.5 | 3 | <0.5 |
| 8 | As described in Example 1 except reflux period was less than 1 hour. | 0.02% trisodium EDTA, 0.02% NaOH | 1 | 180 | 95 | 4 | 1 |
| | | | 2 | 240 | 90 | 6 | 4 |
| 9 | As described in Example 1 except no refluxing was used (reaction mixture was heated to about 182° C. within ¼ to ½ hour at atmospheric pressure). | 0.02% trisodium EDTA, 0.02% NaOH | 1 | 180 | 91.5 | 5 | 3.5 |
| | | | 2 | 210 | 92.5 | 6 | 1.5 |

EXAMPLE 10

The conditioning procedure described in Example 1 was employed for conditioning commercial aniline containing iron, sulfur-containing and halogen-containing impurities except that the reflux temperature was about 185° C. The improved quality of the conditioned aniline was determined by its catalytic hydrogenation to cyclohexylamine. In this test 500 parts of conditioned aniline and 10 parts of 5% palladium-on-carbon catalyst were charged to a reactor equipped with a heated condenser for the exit gases. The reaction mixture was heated to 155–165° C. at a hydrogen pressure of 0–5 p.s.i.g. Hydrogen was then fed to the agitated reaction mixture at a rate of 7–8 standard cubic feet per minute. The temperature in the condenser was maintained at 130–135° C. whereby cyclohexylamine distilled from the reactor substantially as fast as it was formed while most of the aniline entrained in the exit gases was condensed and returned to the reactor. After a period of 1 to 1½ hours the distillation rate of crude cyclohexylamine reached 86.5 parts per hour. At this point fresh conditioned aniline was fed to the reactor to maintain the volume of the reaction mass constant. The reaction was continued for 24 hours. The yields of cyclohexylamine and high boiling compounds expressed as average rates of production in parts per hour were determined by vapor phase chromatography of fractions of the crude distillate. The quality of a sample of non-conditioned aniline was also evaluated by this measure of catalytic hydrogenation. The results of these tests are given in Table 3.

Table 3

| Conditioning technique | Total time of continuous operation hours | Average rates of production ||
|---|---|---|---|
| | | Cyclohexylamine, parts/hr. | High boiling compounds, parts/hr. |
| None | 24 | 30 | 2.1 |
| As described in Example 10 | 24 | 42 | 1.3 |

The above data clearly indicate the improved quality and yield of product obtained by catalytic hydrogenation of aniline conditioned by the process of our invention.

EXAMPLE 11

Commercial nitrobenzene containing iron, sulfur-containing and halogen-containing impurities was conditioned according to the process described in Example 1 except that sodium hydroxide was not added and the reflux temperature was about 211° C. The improve quality of the conditioned nitrobenzene product was determined by catalytic hydrogenation thereof to aniline. A mixture of 1900 parts of conditioned nitrobenzene and 1.0 part of 5% palladium-on-charcoal catalyst was charged to a reactor similar to that described in Example 10. After the agitated mixture had been heated to 150–165° C., hydrogen was fed into the bottom of the reactor at a rate sufficient to maintain an excess of hydrogen at a pressure of 70 p.s.i.g. The condenser was maintained at 100–110° C. to allow the water formed in the reduction to be removed from the reaction mass. A total condenser and receiver were provided in the exit gas system to collect this water. The hydrogenation was continued until the evolution of water ceased. Upon cooling, the reactor was purged of hydrogen with a stream of inert nitrogen gas. The reaction mass was filtered to separate the catalyst. The crude aniline obtained was separated by distillation from any water and high boiling compounds present. The test result was expressed as the percentage of nitrobenzene converted, which was measured by the water evolved during the course of the reaction. The quality of non-conditioned nitrobenzene was also evaluated according to this process. The results of the tests are compared in Table 4.

Table 4

| Conditioning technique | Hydrogenation time, hours | Percent nitrobenzene converted |
|---|---|---|
| None | 2½ | Negligible.[1] |
| As described in Example 11 | 2½ | About 30%. |
| Do | 8 | >99%.[2] |

[1] Less than 1 cc. of water evolved.
[2] Hydrogen uptake fell to less than 0.5 cubic foot/hour.

EXAMPLE 12

Commercial phenol containing 18 p.p.m. of sulfur, 24.1 p.p.m. of chlorine and 196 p.p.m. of acetophenone was conditioned by the process of Example 1 using 0.1% of trisodium EDTA and 0.1% of sodium hydroxide. The resulting product contained 3 p.p.m. of sulfur, 4.8 p.p.m. of chlorine and <1 p.p.m. of acetophenone.

The conditioned phenol was stored for five days at 60° C. in the presence of carbon steel and was then hydrogenated as described in Example 1. The data obtained are given in Table 5.

Table 5

| Catalyst cycle | Time, minutes | Percent cyclohexanone | Percent cyclohexanol | Percent phenol |
|---|---|---|---|---|
| 1 | 150 | 97.0 | 2.5 | <0.5 |
| 2 | 150 | 95.5 | 4.0 | <0.5 |

EXAMPLE 13

A sample of commercial phenol conditioned by the process described in Example 5 was stored at 120° C. in glass under air for 48 hours. The pH, color and the quality of the phenol as evaluated by the hydrogenation test described in Example 1 were noted before and after the storage period. This process was repeated with non-conditioned phenol. The results of these tests are reported in Table 6.

Since certain changes may be made in carrying out the above process without departing from the scope of the invention, it is intended that all matter contained in the above description shall be interpreted as being illustrative and not in a limiting sense.

We claim:

1. A process for purifying a cyclic organic compound containing iron, sulfur and halogen impurities, which compound is selected from the group consisting of phenol, aniline, nitrobenzene, nitrocyclohexane, quinoline, toluidine and methylene dianiline, which comprises the steps of (1) commingling said cyclic organic compound with a purifying agent selected from the group consisting of ethylenediaminetetraacetic acid and the alkali metal salts thereof in amount of at least 0.001% (calculated as the trisodium salt of ethylenediaminetetraacaetic acid) by weight of the compound being treated, (2) heating the mixture at temperature of at least about 80° C. for a period of at least about one hour and (3) distilling off the purified compound from the mixture.

2. The process of claim 1 wherein the heating step is carried out at temperature of about 150° C. to 250° C. for a period of about two to six hours.

3. The process of claim 1 wherein the cyclic organic compound is phenol.

4. The process of claim 1 wherein the cyclic organic compound is aniline.

5. The process of claim 1 wherein the cyclic organic compound is nitrobenzene.

*Table 6*

| Conditioning technique | Color before storage | Color after storage | pH before storage | pH after storage | Hydrogen test data before storage | | | | |
|---|---|---|---|---|---|---|---|---|---|
| | | | | | Catalyst cycle | Time, minutes | Percent cyclo-hexanone | Percent cyclo-hexanol | Percent phenol |
| None | Light tan | Dark brown | 5.9 | 5.24 | 1 | 195 | <40 | | >60 |
| As described in Example 5 | Colorless | Light tan | 6.25 | 5.79 | 1 | 150 | 97.6 | 1.7 | 0.7 |
| | | | | | 2 | 155 | 98.5 | 1.2 | 0.3 |
| | | | | | Hydrogenation test data after storage | | | | |
| Do | | | | | 1 | 165 | 96.4 | 3.5 | 0.1 |

EXAMPLES 14 AND 15

A sample of commercial phenol treated as described in Example 1 using 0.1% of trisodium EDTA and 0.1% of sodium hydroxide was stored for 120 hours at 60° C. in a carbon steel container whose effective exposure area was 400 square centimeters per liter of phenol. Before and after storage the quality of the phenol was evaluated by catalytic hydrogenation as described in Example 1. This process was repeated with a sample of commercial phenol treated as described in Example 1 using 0.1% of sodium hydroxide but no conditioning agent. The results of these experiments are compared in Table 7.

*Table 7*

| Example | Conditioning technique | Treating agents | Hydrogenation test data before storage | | | | |
|---|---|---|---|---|---|---|---|
| | | | Catalyst cycle | Time, minutes | Percent cyclo-hexanone | Percent cyclo-hexanol | Percent phenol |
| 14 | As described in Example 1 except higher concentration of treating agents was used. | 0.1% trisodium EDTA 0.1% NaOH | 1 | 160 | 97.1 | 2.0 | 0.9 |
| | | | 2 | 155 | 97.6 | 2.1 | 0.3 |
| 15 | As described in Example 1 except 0.1% sodium hydroxide but no conditioning agent was used. | 0.1% NaOH | 1 | 150 | 95.5 | 3.5 | 1.0 |
| | | | 2 | 150 | 92.5 | 4.0 | 3.5 |
| | | | Hydrogenation test data after storage | | | | |
| 14 | | | 1 | 150 | 98.4 | 1.4 | 0.2 |
| | | | 2 | 155 | 96.2 | 3.4 | 0.4 |
| 15 | | | 1 | 180 | 93.5 | 2.5 | 4.0 |
| | | | 2 | 240 | 87.5 | 2.5 | 10.0 |

EXAMPLE 16

A sample of commercial aniline which had been conditioned by the process described in Example 10 was stored in glass under air at ambient temperature. The color of the aniline was evaluated in Barrett units before and during storage. This experiment was repeated with non-conditioned aniline. The results of these experiments are set forth in Table 8.

*Table 8*

| Conditioning technique | Treating agents | Color of aniline after intervals of— | | | | | |
|---|---|---|---|---|---|---|---|
| | | 0 hour | 150 hours | 200 hours | 250 hours | 400 hours | 600 hours |
| None | None | 1 | 2 | 3 | | | 2 |
| As described in Example 10 | 0.02% trisodium EDTA 0.02% NaOH | <1 | | | <1 | 2 | 2 |

6. The process of claim 1 wherein the purifying agent is employed in amount within the range of about 0.01 to 2% (calculated as the trisodium salt of ethylenediaminetetraacetic acid) by weight of the compound being treated.

7. The process of claim 1 wherein the purifying agent is employed in amount within the range of about 0.015 to 0.1% (calculated as the trisodium salt of ethylenediaminetetraacetic acid) by weight of the compound being treated.

8. A process for purifying phenol containing iron, sulfur and halogen impurities which comprises the steps of (1) commingling the phenol with (a) a purifying agent selected from the group consisting of ethylenediaminetetraacetic acid and the alkali metal salts thereof, in amount of at least 0.001% (calculated as the trisodium salt of ethylenediaminetetraacetic acid) by weight of the compound being treated, and (b) a caustic alkali, (2) heating the mixture at temperature of at least about 80° C. for a period of at least about one hour and (3) distilling off the purified phenol from the mixture.

9. The process of claim 8 wherein the purifying agent is the trisodium salt of ethylenediaminetetraacetic acid.

10. The process of claim 8 wherein the purifying agent is employed in amount within the range of about 0.01 to 2% (calculated as the trisodium salt of ethylenediaminetetraacetic acid) by weight of the phenol.

11. The process of claim 10 wherein the caustic alkali is employed in amount about equal to the weight of the purifying agent.

12. The process of claim 8 wherein the purifying agent is employed in amount within the range of about 0.015 to 0.1% (calculated as the trisodium salt of ethylenediaminetetraacetic acid) by weight of the phenol.

13. The process of claim 8 wherein the heating step is carried out at temperature of about 150° C. to 250° C. for a period of about two to six hours.

References Cited by the Examiner

Martell et al.: "The Properties and Uses of Ethylenediamine Tetra Acetic Acid and its Salts," 1949, page 11 (last page).

Versene: Technical Bulletin No. 1, 1949, page 2.

LEON ZITVER, *Primary Examiner.*

CHARLES B. PARKER, *Examiner.*